(12) United States Patent
Miller-Smith

(10) Patent No.: US 7,154,913 B2
(45) Date of Patent: Dec. 26, 2006

(54) DECODER SUPPORTING MULTIPLE INPUTS

(75) Inventor: Richard M. Miller-Smith, Lingfield (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 945 days.

(21) Appl. No.: 09/975,380

(22) Filed: Oct. 10, 2001

(65) Prior Publication Data

US 2002/0051469 A1  May 2, 2002

(30) Foreign Application Priority Data

Oct. 26, 2000  (GB)  .................. 0026208.9

(51) Int. Cl.
  *H04H 1/04* (2006.01)
  *H04J 3/04* (2006.01)

(52) U.S. Cl. ...................... 370/486; 370/535

(58) Field of Classification Search ........ 370/535–539, 370/486–490; 348/705, 706, 725, 726, 731
See application file for complete search history.

(56) References Cited

U.S. PATENT DOCUMENTS

| | | | |
|---|---|---|---|
| 4,695,880 A * | 9/1987 | Johnson et al. ............. 725/144 |
| 5,420,866 A * | 5/1995 | Wasilewski .................. 370/426 |
| 5,550,576 A | 8/1996 | Klosterman .................... 348/6 |
| 5,627,892 A * | 5/1997 | Kauffman ................... 380/212 |
| 5,719,637 A | 2/1998 | Ohkura et al. ............. 348/564 |
| 5,757,909 A * | 5/1998 | Park ........................... 380/201 |
| 5,852,290 A * | 12/1998 | Chaney ....................... 235/492 |
| 6,035,037 A | 3/2000 | Chaney ........................ 380/10 |
| 6,064,676 A * | 5/2000 | Slattery et al. ............. 370/412 |
| 6,295,321 B1* | 9/2001 | Lyu ........................ 375/240.25 |
| 6,298,400 B1* | 10/2001 | Candelore ..................... 710/71 |
| 6,591,419 B1* | 7/2003 | Barry et al. ................... 725/25 |
| 6,741,288 B1* | 5/2004 | Kessler ..................... 348/385.1 |
| 6,996,101 B1* | 2/2006 | Coupe et al. ................ 370/389 |
| 2002/0012069 A1* | 1/2002 | Murakami et al. ........... 348/555 |
| 2004/0181814 A1* | 9/2004 | Ellis et al. ................... 725/134 |

FOREIGN PATENT DOCUMENTS

| | | |
|---|---|---|
| EP | 0917355 A1 | 11/1997 |
| EP | 0849948 A2 | 6/1998 |
| EP | 0884907 A1 | 12/1998 |
| EP | 0910218 A2 | 4/1999 |
| EP | 0912058 A2 | 4/1999 |
| EP | 0912059 A2 | 4/1999 |
| EP | 0920206 A1 | 6/1999 |
| EP | 0920207 A1 | 6/1999 |
| EP | 1056279 A1 | 5/2000 |
| WO | WO9966725 | 12/1999 |

* cited by examiner

*Primary Examiner*—Chau Nguyen
*Assistant Examiner*—Hong Sol Cho
(74) *Attorney, Agent, or Firm*—Michael E. Belk; Paul Im

(57) ABSTRACT

A decoder has tuners for receiving data from different sources. Each tuner has an associated demultiplexer controlled to select a portion of a received signal corresponding to a selected channel or channels. The demultiplexer output to a remultiplexer configured to determine selected signal portions that have overlapping addresses, to reallocate addresses of the signal portions so there is no overlap, and to multiplex the signal portions for supply to a common interface slot.

20 Claims, 3 Drawing Sheets

DECODER SUPPORTING MULTIPLE INPUTS

The present invention relates to a decoder suitable for use as a set-top-box or in an integrated digital television that supports multiple inputs.

Television programme broadcasts and interactive services transmitted over digital transmission systems such as Cable, Satellite or Radio Frequency based systems are normally multiplexed, encoded and encrypted in order to be transmitted. Upon receipt, the signal containing the broadcast or service must be routed through a decoder in order for the portion of the signal corresponding to a channel or service selected by a viewer to be demultiplexed, decoded and decrypted before being passed onto the television for display. One form of decoder is a set-top-box that is positioned between the signal receiver (aerial, cable node, satellite dish etc.) and the television. As an alternative to an external set-top-box, the decoder may be integrated into a television set. Both types of decoder perform the same sort of functions but have different physical positions in relation to the signal receiver and the television set.

The architecture of a typical decoder is schematically shown in FIG. 1. A signal receiver (not shown) is normally connected via a cable to an input 5 of the decoder 10. The input 5 is connected to a tuner 20 which is in turn connected to a Common Interface (CI) slot 30. The CI slot 30 outputs to a demultiplexer 40 that is connected to a decoder 50. The decoder feeds a number of outputs 60, 70 to which audio-visual apparatus can be connected. A system processor 80 controls the operation of the decoder 10. Input means 90 may be connected to the system processor 80 to allow external control of the decoder 10.

Broadcasters use the opportunity offered by encrypted transmission to charge viewers for access to individual or groups of broadcasts and services. This is achieved by supplying on a smart card (not shown) only the decryption keys for the broadcasts or services the viewer has purchased. The smart card is inserted into the CI slot 30 allowing the decoder to access the decryption keys and engine to decrypt the broadcasts or services selected. In order to ensure compatibility between different manufacture's decoders and smart cards of different broadcasters or service providers in Europe, the Common Interface standard (CI) was agreed. Throughout the remainder of this document the slots will be referred to as CI slots and smart cards as CI cards. However, other slot and card types and other key-based decryption systems including those of other standards could also be accommodated in the decoders described.

In operation, a received signal is fed to the input 5 of the decoder 10. The tuner 20 passes the signal to the CI slot 30. If a CI card (not shown) is inserted in the CI slot 30, the signal is routed through the card. The system processor 80 controls the card to process and decrypt a particular portion of the signal corresponding to a selected broadcast or service. The processed signal is then passed to the demultiplexer 40 which, under the control of the system processor 80, demultiplexes the signal to retrieve the decrypted portion of the signal. The portion of the signal is then passed to the decoder 50 which decodes the signal into video and audio components that are then passed to the relevant outputs 60, 70.

Decoders such as that described above with reference to FIG. 1 offer perfectly acceptable performance and functionality when used for their intended purpose, receiving a signal from a single broadcaster or service provider and allowing access to the signal's components. However, the described architecture cannot cope with receiving two or more signals from different sources (eg. cable and satellite). Multiple CI cards cannot be supported in the above architecture without providing multiple CI slots. In addition, incoming signals are likely to have components using the same identifier or address, i.e., overlapping address. This may be the same broadcast received from two separate suppliers or it may be two or more different broadcasts. In either case, no form of conflict resolution is provided in the current architecture.

The only solution known at present is to have one decoder per signal source. Set-top-box type decoders output the selected broadcast or service onto the frequency or address that is associated with the set-top-box in the television so there is no conflict. This is an extremely expensive solution requiring a complete decoder for each signal source. In addition, this solution is not seamless in that channels must be changed both on the television and on the particular set top box. The solution also occupies considerable space in a viewer's home which is undesirable.

According to one aspect of the present invention, there is provided a decoder comprising a plurality of tuners for receiving data from different sources, each having an associated demultiplexer controlled to select a portion of a received signal corresponding to a selected channel or channels, the demultiplexers being arranged to output to a remultiplexer configured to determine selected signal portions that have overlapping addresses, to reallocate addresses of the signal portions so there is no overlap, and to multiplex the signal portions for supply to a common interface slot.

The present invention allows a number of sources to be decoded by a single decoder whilst sharing a large number of hardware components. In addition, different channels from different sources may be routed to a common CI card or to different CI cards. Selection to a CI card may be in dependence on a signal's content, source or other parameters.

The common interface slot may be arranged to route the multiplexed signal portions through any inserted common interface card and then on to a demultiplexer for dividing the multiplexed signal portions and routing at least a part of the divided output to its destination.

The decoder may have a switching unit connecting the demultiplexers to a number of remultiplexers, the switching unit being arranged to accept signal portions from the demultiplexers and to selectively switch each signal portion to one or more of the remultiplexers, each remultiplexer being configured to determine those signal portions that have overlapping addresses, to reallocate addresses of the signal portions so there is no overlap, and to multiplex the signal portions for supply to a common interface slot.

Each remultiplexer may be connected to a different common interface slot.

A signal portion may be switched to a remultiplexer in dependence on its content.

A signal portion may be switched to a remultiplexer in dependence on its source.

An address may comprise a channel identifier.

Upon reallocating an address, a new index stream may be created and embedded within the signal portion.

Examples of the present invention will now be described in detail, by way of example only, and with reference to the accompanying drawings in which:

FIG. 2 is a schematic diagram of the architecture of a decoder according to one example of the present invention.

Figure 1:
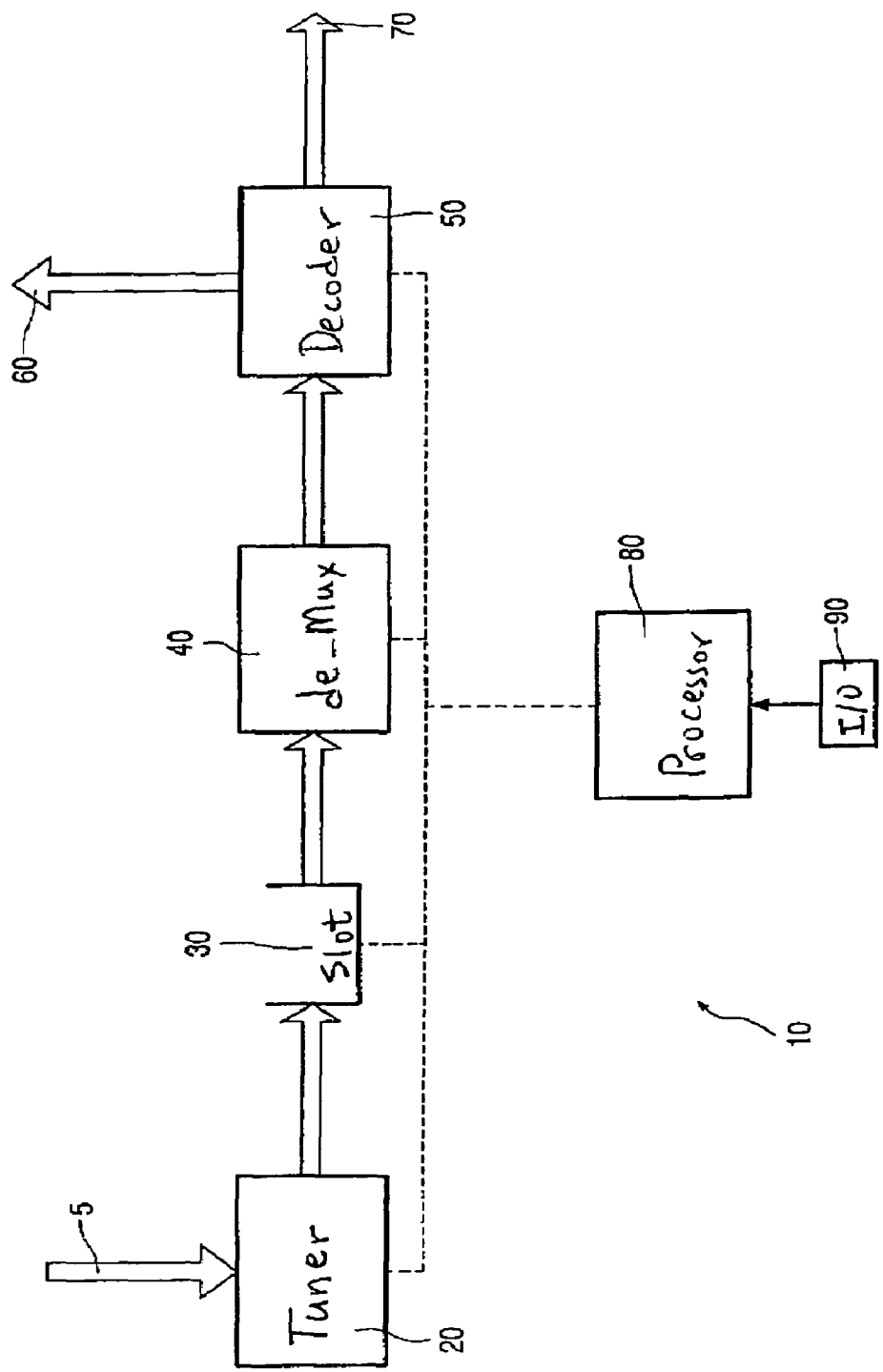
FIG. 1 is a schematic diagram of the architecture of a typical decoder.

The decoder 100 includes a number of tuners 110a–110d, a corresponding number of demultiplexers 120a–120d, a remultiplexer 130, a CI slot 140, a demultiplexer 150, a decoder 160 and a control processor 170.

Each tuner 110a–110d can be connected to a separate signal source. Each tuner passes its respective signal to its associated demultiplexer. The demultiplexer separates the signal into portions, each corresponding to a broadcast or provided service. The control processor 170 controls the demultiplexer to output one of the portions to the remultiplexer 130. Control from the control processor 170 is normally on the basis of a channel or service selected by a viewer. However, control may be from predetermined instructions hardcoded in the decoder 10. The remultiplexer 130 receives the selected signal portion from each demultiplexer 120a–120d. The signal portions are remapped if necessary in the remultiplexer 130 so that no two signal portions occupy the same address or have the same identity code, i.e., overlapping address. The remapping may be effected by, e.g., reallocating addresses, as described above. If the identity code or address is changed, a new index stream may be created and embedded in the signal. The signal portions are then remultiplexed into a single signal and output to the CI slot 140. At the CI slot a CI card is inserted containing decryption keys.

Portions of the signal corresponding to broadcasts for which decryption keys are held are decrypted under the control of the control processor 170 and the signal is then passed to the main demultiplexer 150. At the demultiplexer 150 the signal is broken into separate signal, each corresponding to each broadcast or service. In dependence on instructions issued by the control processor 170, the demultiplexer 150 routes one or more of the separate signals to the decoder 160 to decode the signal into audio and visual components for output to a television. Alternatively or in addition, one or more of the signals maybe routed to a storage medium, a second television, a PC (all not shown) etc.

Figure 2:
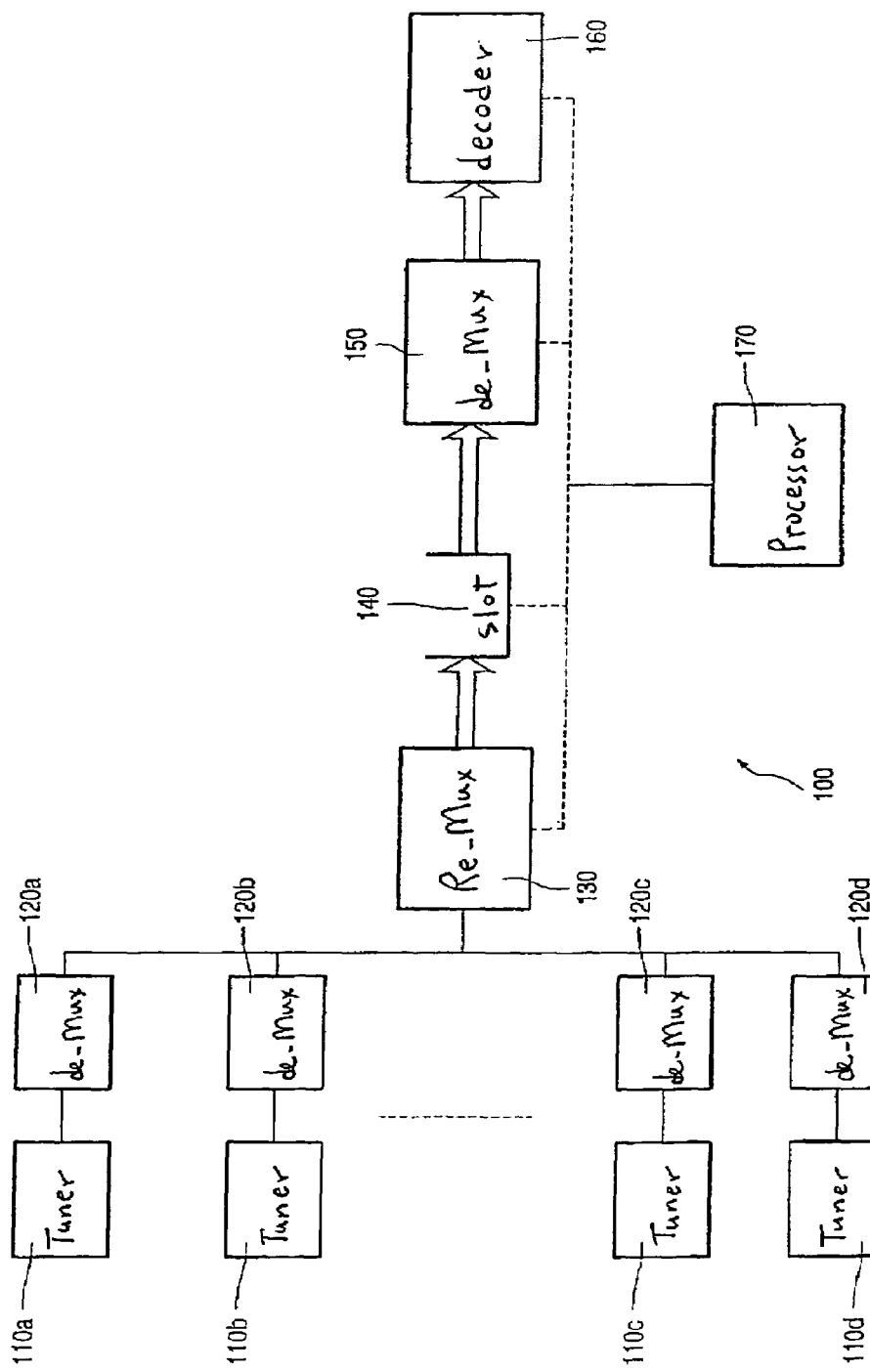
FIG. 2 is a schematic diagram of the architecture of a decoder according to one example of the present invention; and, FIG. 3 is a schematic diagram of the architecture of a decoder according to another example of the present invention.
Figure 3:
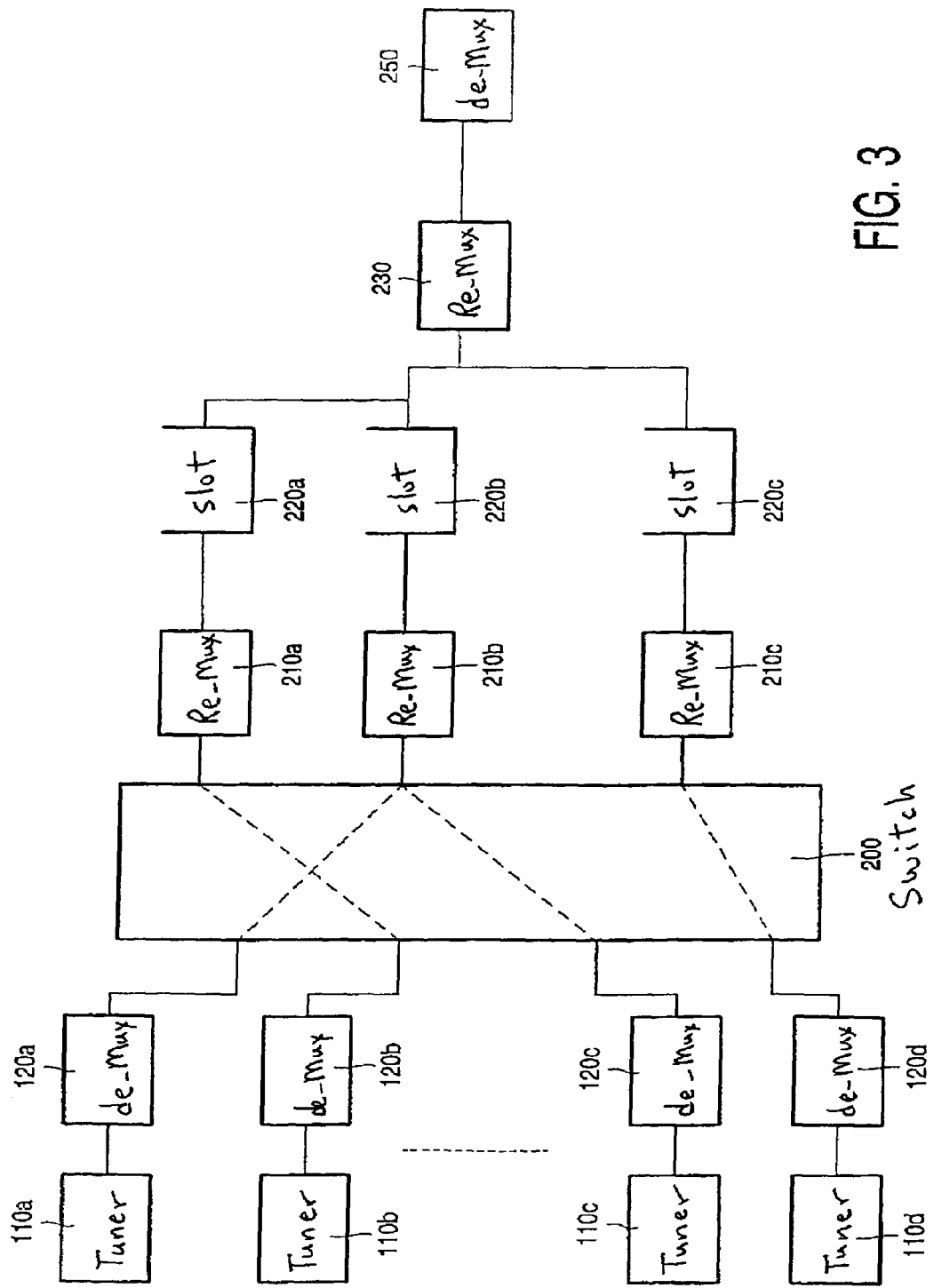

FIG. 3 is a schematic diagram of the architecture of a decoder, modified from that of FIG. 2, according to another example of the present invention.

Each demultiplexer 120a–120d is connected to a switch 200. Under the control of the control processor 170 (FIG. 2) the switch 200 routes the separate signals from the demultiplexers 120a–120d to one of a number of remultiplexers 210a–210c. Each remultiplexer 210a–210c is connected to a CI slot 220a–220c. The routing in the switch 200 is performed in dependence on network and channel identifiers within each signal and in dependence on the broadcasts and services CI cards in the CI slots 220a–220c can decrypt. The broadcasts and services a CI card can decrypt may be determined by accessing the card itself or via some external data source. In this manner broadcasts or services are routed to the correct CI card. The outputs from the CI slots 220a–c are then remultiplexed in a remultiplexer 230 and then passed to a demultiplexer 250 which operates to route the signal to its destination.

In this manner a single decoder can process multiple signal sources and output them to a number of destinations, possibly at the same time. All broadcasts and services can be routed to, and decrypted by, a single CI card or through a number of CI cards. The requirement to have multiple decoders to cater for multiple sources or multiple destinations requiring different signals at the same time is therefore solved by a single, relatively simple, decoder.

The invention claimed is:

1. A decoder comprising a plurality of tuners for receiving data from different sources, each having an associated demultiplexer controlled to select a portion of a received signal corresponding to a selected channel or channels, the demultiplexers being arranged to output to a remultiplexer configured to determine selected signal portions that have overlapping addresses, to reallocate addresses of the signal portions so there is no overlap, and to multiplex the signal portions for supply to a common interface slot.

2. A decoder according to claim 1, in which the common interface slot is arranged to route the multiplexed signal portions through any inserted common interface card and then on to a demultiplexer for dividing the multiplexed signal portions and routing at least a part of the divided output to its destination.

3. A decoder according to claim 1, further comprising a switching unit connecting the demultiplexers to a number of remultiplexers, the switching unit being arranged to accept signal portions from the demultiplexers and to selectively switch each signal portion to one or more of the remultiplexers, each remultiplexer being configured to determine those signal portions that have overlapping addresses, to reallocate addresses of the signal portions so there is no overlap, and to multiplex the signal portions for supply to a common interface slot.

4. A decoder according to claim 3, in which each remultiplexer is connected to a different common interface slot.

5. A decoder according to claim 3, in which a signal portion is switched to a remultiplexer in dependence on its content.

6. A decoder according to claim 3, in which a signal portion is switched to a remultiplexer in dependence on its source.

7. A decoder according to claim 1, in which an address comprises a channel identifier.

8. A decoder according to claim 1, in which upon reallocating an address, a new index stream is created and embedded within the signal portion.

9. A decoder according to claim 1, wherein each of the demultiplexers is connected to a switching unit that routes signals from the demultiplexers to the remultiplexer.

10. A decoder according to claim 9, wherein, routing of the switching unit is performed based on a combination of network and channel identifiers being arranged to accept signal portions from the demultiplexers and to selectively switch each signal portion to one or more of the remultiplexers, wherein the remultiplexers are configured to determine those signal portions that have overlapping addresses, to reallocate addresses of the signal portions so there is no overlap, and to multiplex the signal portions for supply to the common interface slot.

11. A decoder comprising
   a plurality of tuners that are each operatively coupled to receive data from a plurality of different sources,
   a plurality of demultiplexers associated with the plurality of tuners, the demultiplexers being controlled to select a portion of a received signal from the sources,
   a remultiplexer configured to receive an output of the demultiplexers, determine if the portions have overlapping addresses, and to reallocate addresses of the portions so there is no overlap, and to multiplex the portions.

12. A decoder according to claim 11, in which the multiplexed the portions are supplied to a common interface slot that is arranged to route the multiplexed signal portions through any inserted common interface card and also to a demultiplexer for dividing the multiplexed signal portions.

13. A decoder according to claim 11, comprising a switching unit connecting the demultiplexers to a number of remultiplexers, the switching unit being arranged to accept signal portions from the demultiplexers and to selectively switch each signal portion to one or more of the remultiplexers, each remultiplexer being configured to determine those signal portions that have overlapping addresses, to reallocate addresses of the signal portions so there is no overlap, and to multiplex the signal portions for supply to a common interface slot.

14. A decoder according to claim 13, in which each remultiplexer is connected to a different common interface slot.

15. A decoder according to claim 13, in which a signal portion is switched to a remultiplexer in dependence on its content.

16. A decoder according to claim 13, in which a signal portion is switched to a remultiplexer in dependence on its source.

17. A decoder according to claim 11, in which an address comprises a channel identifier.

18. A decoder according to claim 11, in which upon reallocating an address, a new index stream is created and embedded within the signal portion.

19. A decoder according to claim 11, wherein each of the demultiplexers is connected to a switching unit that routes signals from the demultiplexers to the remultiplexer.

20. A decoder according to claim 19, wherein, routing of the switching unit is performed based on a combination of network and channel identifiers, being arranged to accept signal portions from the demultiplexers and to selectively switch each signal portion to one or more of the remultiplexers, wherein the remultiplexers are configured to determine those signal portions that have overlapping addresses, to reallocate addresses of the signal portions so there is no overlap, and to multiplex the signal portions for supply to the common interface slot.

* * * * *